(12) United States Patent
Ramesh et al.

(10) Patent No.: US 7,565,373 B2
(45) Date of Patent: Jul. 21, 2009

(54) AUTOMATING BUSINESS EVENTS

(75) Inventors: Bhashyam Ramesh, Secunderabad (IN); Pekka Kostamaa, Santa Monica, CA (US)

(73) Assignee: Teradata US, Inc., Miamisburg, OH (US)

( * ) Notice: Subject to any disclaimer, the term of this patent is extended or adjusted under 35 U.S.C. 154(b) by 447 days.

(21) Appl. No.: 11/295,777

(22) Filed: Dec. 7, 2005

(65) Prior Publication Data
US 2007/0130174 A1 Jun. 7, 2007

(51) Int. Cl.
*G06F 17/30* (2006.01)

(52) U.S. Cl. .................. 707/102; 707/104.1; 705/8

(58) Field of Classification Search .............. None
See application file for complete search history.

(56) References Cited

U.S. PATENT DOCUMENTS

| | | | |
|---|---|---|---|
| 6,826,579 B1 * | 11/2004 | Leymann et al. | 717/131 |
| 6,829,616 B2 * | 12/2004 | Chen et al. | 707/102 |
| 7,356,482 B2 * | 4/2008 | Frankland et al. | 705/8 |
| 2003/0105974 A1 * | 6/2003 | Griffin et al. | 713/200 |
| 2004/0002918 A1 * | 1/2004 | McCarthy et al. | 705/40 |
| 2005/0043982 A1 * | 2/2005 | Nguyen | 705/8 |
| 2007/0150330 A1 * | 6/2007 | McGoveran | 705/8 |

OTHER PUBLICATIONS

U.S. Appl. No. 09/476,711, McGoveran, filed Dec. 30, 1999; http://portal.uspto.gov/external/portal/pair.*

* cited by examiner

*Primary Examiner*—Debbie M Le
(74) *Attorney, Agent, or Firm*—Howard Speight (57) ABSTRACT

A method, computer system, and database system for automating a business rule in a database are disclosed. One or more database triggers associated with a business rule state machine are enabled and the business rule state machine is initialized.

16 Claims, 14 Drawing Sheets

State Definition Table
for
State Machine in Fig. 9

| State | Table | Condition |
|---|---|---|
| 1 | Stock Table | Company Name = "StockA" AND StockPrice >= $20 |
| 1 | Stock Table | Company Name = "StockB" AND StockPrice <= $50 |
| 2 | Stock Table | Company Name = "StockA" AND StockPrice < $20 |
| 2 | Stock Table | Company Name = "StockB" AND StockPrice <= $50 |
| 3 | Stock Table | Company Name = "StockA" AND StockPrice >= $20 |
| 3 | Stock Table | Company Name = "StockB" AND StockPrice > $50 |
| 4 | Stock Table | Company Name = "StockA" AND StockPrice < $20 |
| 4 | Stock Table | Company Name = "StockB" AND StockPrice > $50 |

*FIG. 10*

State Transition Table
for
State Machine in Fig. 9

| State | Event | New State |
|-------|-------|-----------|
| 1 | A | 2 |
| 1 | C | 3 |
| 2 | B | 1 |
| 2 | C | 4 |
| 3 | A | 4 |
| 3 | D | 1 |

*FIG. 11*

Database Triggers Table
for
State Machine in Fig. 9

| Event | Trigger |
|---|---|
| A | CREATE TRIGGER EventA DISABLED<br>AFTER UPDATE OF (StockPrice) ON StockTable<br>WHEN (CompanyName = 'StockA'<br>and StockPrice < 20)  DeclareEvent(BusinessRule, A); |
| B | CREATE TRIGGER EventB DISABLED<br>AFTER UPDATE OF (StockPrice) ON StockTable<br>WHEN (CompanyName = 'StockA'<br>and StockPrice > 20)  DeclareEvent(BusinessRule, B); |
| C | CREATE TRIGGER EventC DISABLED<br>AFTER UPDATE OF (StockPrice) ON StockTable<br>WHEN (CompanyName = 'StockB'<br>and StockPrice > 50)  DeclareEvent(BusinessRule, C); |
| D | CREATE TRIGGER EventD DISABLED<br>AFTER UPDATE OF (StockPrice) ON StockTable<br>WHEN (CompanyName = 'StockB'<br>and StockPrice < 50)  DeclareEvent(BusinessRule, D); |

*FIG. 12*

Action Table for State Machine in Fig. 9

| State | Terminate | Action |
|---|---|---|
| 4 | Yes | INSERT row into Queue Table to sell Stock B. INSERT row into Queue Table to buy StockA. |

FIG. 13

Current State Table for State Machine in Fig. 9

| Current State |
|---|
| 1 |

FIG. 14

AUTOMATING BUSINESS EVENTS

BACKGROUND

Business events are common in commerce. A simple business event may occur when a single action is taken in response to a single stimulus. More complicated business events may involve multiple actions being taken in response to multiple stimuli. The relationships between the stimuli and the actions may be called business rules.

SUMMARY

In general, in one aspect, the invention features a database system for automating a business rule. The database system includes a state definition table defining one or more states for a business rule state machine. The database system further includes a state transition table defining (a) one or more beginning states, (b) for each beginning state a corresponding ending state, each of the beginning states and the ending states corresponding to a state in the state definition table, and (c) for each beginning state an event that causes a transition from the beginning state to the corresponding ending state. The database system further includes a database triggers table defining the one or more database triggers, each event identified in the state transition table being associated in the database triggers table with one or more of the database triggers, the database triggers in the database triggers table being disabled except when the business rule is activated. The database system further includes an action table defining one or more actions to be performed on entering one or more of the states identified in the state definition table. The database system further includes a current state table defining the current state of the business rule state machine when the business rule is activated.

Implementations of the invention may include one or more of the following. The database may include a pseudo lock to serialize access to the current state table. The database may include a current state table for each user of the business rule state machine. The database may include a database triggers table for each user of the business rules state machine. One or more of the state definition table, the state transition table, the database triggers table, the action table, and the current state table may be included in the same database table. The action table may include a "terminate" flag associated with one or more states, such that upon completion of the action associated with that state, the business rule will be deactivated by disabling the database triggers.

In general, in another aspect, the invention features a method for automating a business rule in a database. The method includes enabling one or more database triggers associated with a business rule state machine and initializing the business rule state machine.

Implementations of the invention may include one or more of the following. The method may include creating the business rule state machine by creating a state definition table defining one or more states, each of the states corresponding to one or more conditions of a system. Creating the business rule state machine may include creating a state transition table defining (a) one or more beginning states, (b) for each beginning state a corresponding ending state, each of the beginning states and the ending states corresponding to a state in the state definition table, and (c) for each beginning state an event that causes a transition from the beginning state to the corresponding ending state. Creating the business rule state machine may include creating a database triggers table defining the one or more database triggers, each event identified in the state transition table being associated in the database triggers table with one or more of the database triggers, the database triggers being disabled except when the business rule is activated. Creating the business rule state machine may include creating an action table defining one or more actions to be performed on entering one or more of the states identified in the state definition table. Creating the business rule state machine may include creating a current state table defining the current state of the business rule state machine. Initializing the business rule state machine may include determining a current state of the business rule state machine by determining which of the states in the state definition table corresponds to current conditions and initializing the current state table with the determined current state. The method may further include providing parallel access to the business rule state machine by creating a current state table for each user of the business rule state machine. Creating the action table may further include associating a "terminate" flag with one or more states, such that upon completion of an action associated with that state, the business rule will be deactivated by disabling the database triggers. The method may further include creating an action table for each user of the business rules state machine. The method may further include serializing access to the business rule machine.

In general, in another aspect, the invention features a computer program, stored on a tangible storage medium, for use in automating a business rule in a database. The computer program includes executable instructions that cause a computer to enable one or more database triggers associated with a business rule state machine and to initialize the business rule state machine.

DETAILED DESCRIPTION

A business event automation system stores business rules with the stimuli used to drive the rules.

Figure 1:
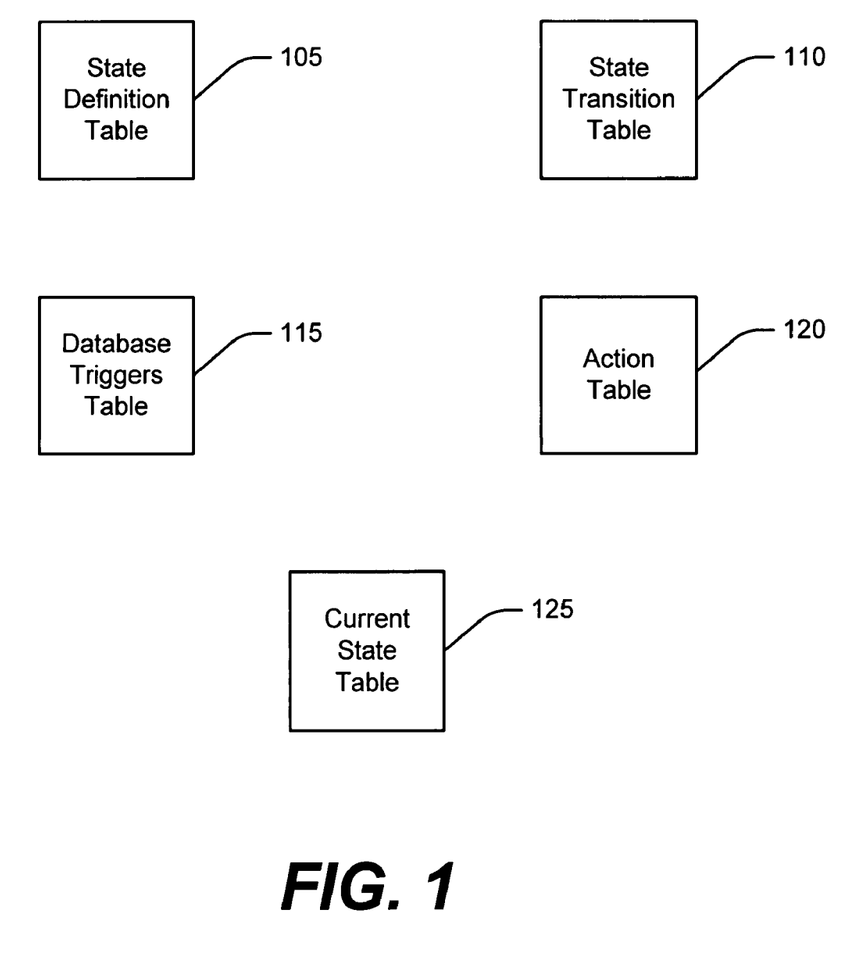
FIG. 1 is a block diagram of a database system for use in automating business events.

In particular, the business rules are stored in tables in a relational database management system (RDBMS), as shown in FIG. 1. The tables include a state definition table 105, a state transition table 110, a database triggers table 115, an action table 120, and a current state table 125. The tables define a state machine that implements a business rule. The stimuli that drive the state machine are database triggers that detect changes in the data managed by the RDBMS.

It will be understood that the tables defined above are merely exemplary. The tables could be combined (i.e., one or more of the above tables could be combined into a single table) or split (i.e., one or more of the above tables could be divided into two or more tables).

Figure 2:
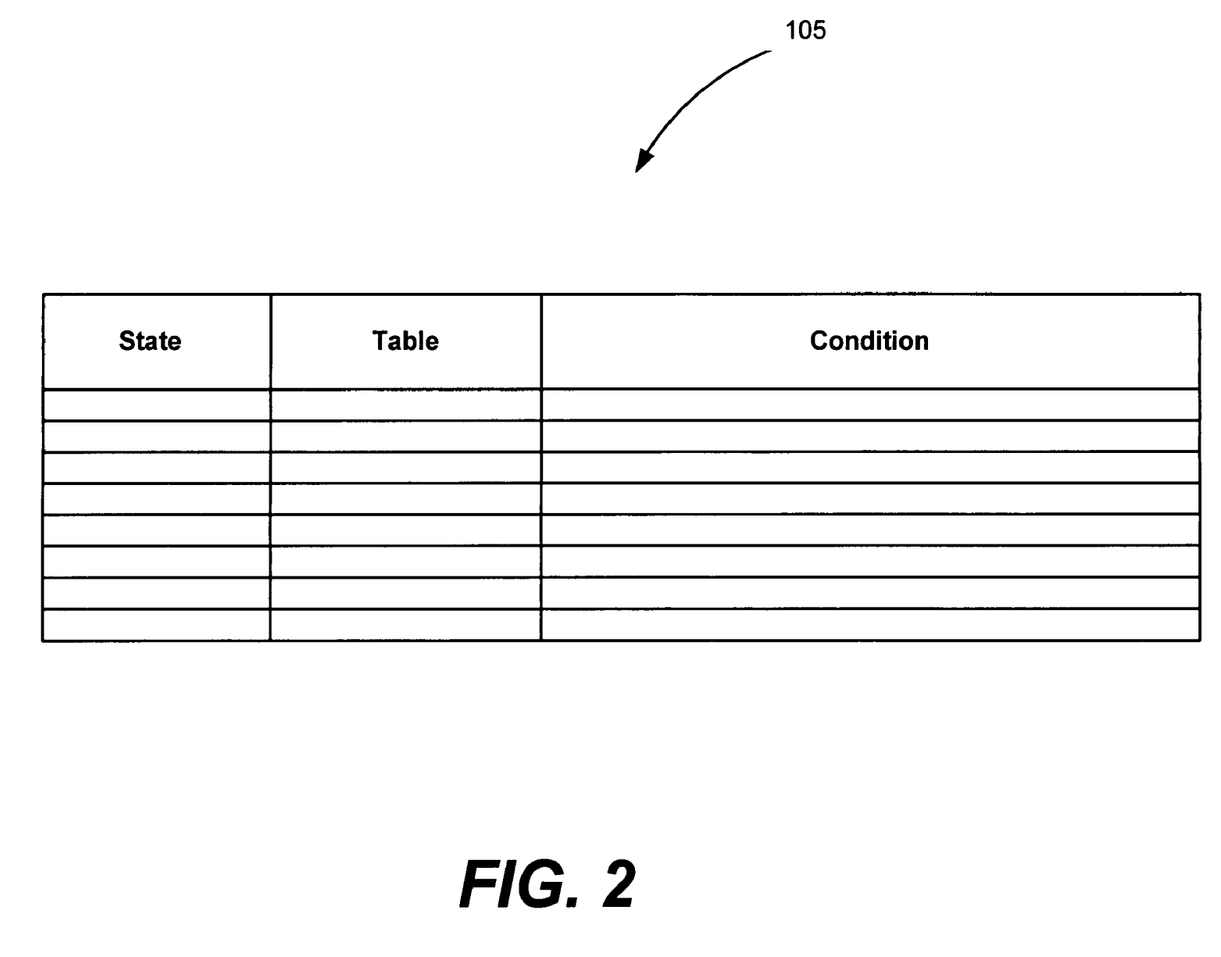
FIG. 2 is a representation of an example of a state definition table.

The state definition table 105, shown in greater detail in FIG. 2, defines the condition or conditions associated with each of the states in the state machine. In the example shown in FIG. 2, it includes three columns (state, table, and condition) and a row for each condition associated with a state. Each state may have one or more condition associated with it. All of the conditions associated with a state must be satisfied in order for the state machine to be in that state. The state column includes a number or some other indicator for the state. The table column contains a pointer to the table or tables containing data that defines that state. For example, the table column may contain the name of the table or tables. The condition column includes a condition associated with that state.

Figure 3:
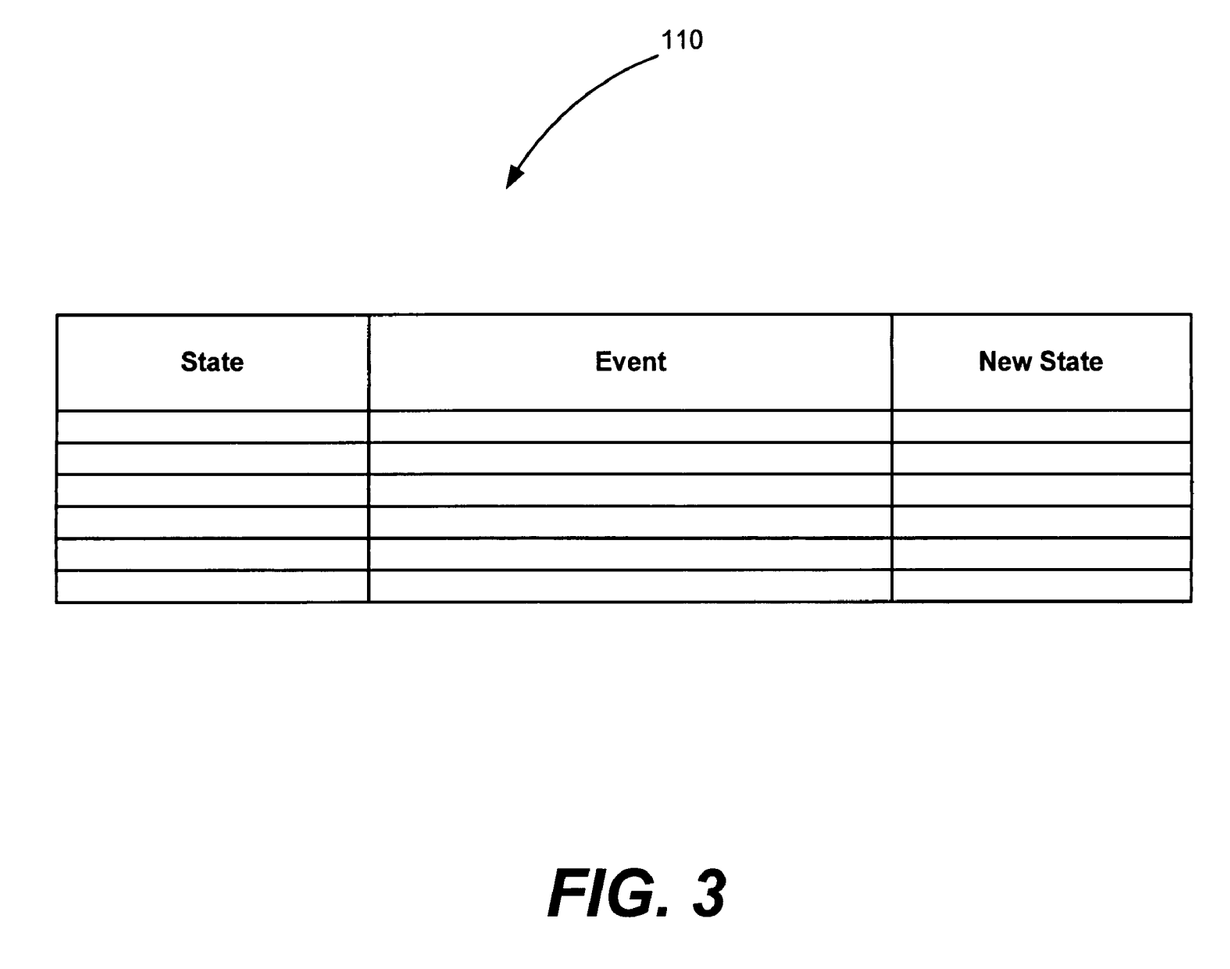
FIG. 3 is a representation of an example of a state transition table.

The state transition table 110, shown in greater detail in FIG. 3, identifies the events that will cause the business machine to transition from one state to another. In the example shown in FIG. 3, the state transition table 110 includes three columns (state, event, and new state) and a row for each transition. The state column includes a number or some other indicator for the state. The new state column includes a number or some other indicator for a new state. The event column in a row identifies an event that will cause the state machine to transition from the state in that row to the new state in that row.

Figure 4:
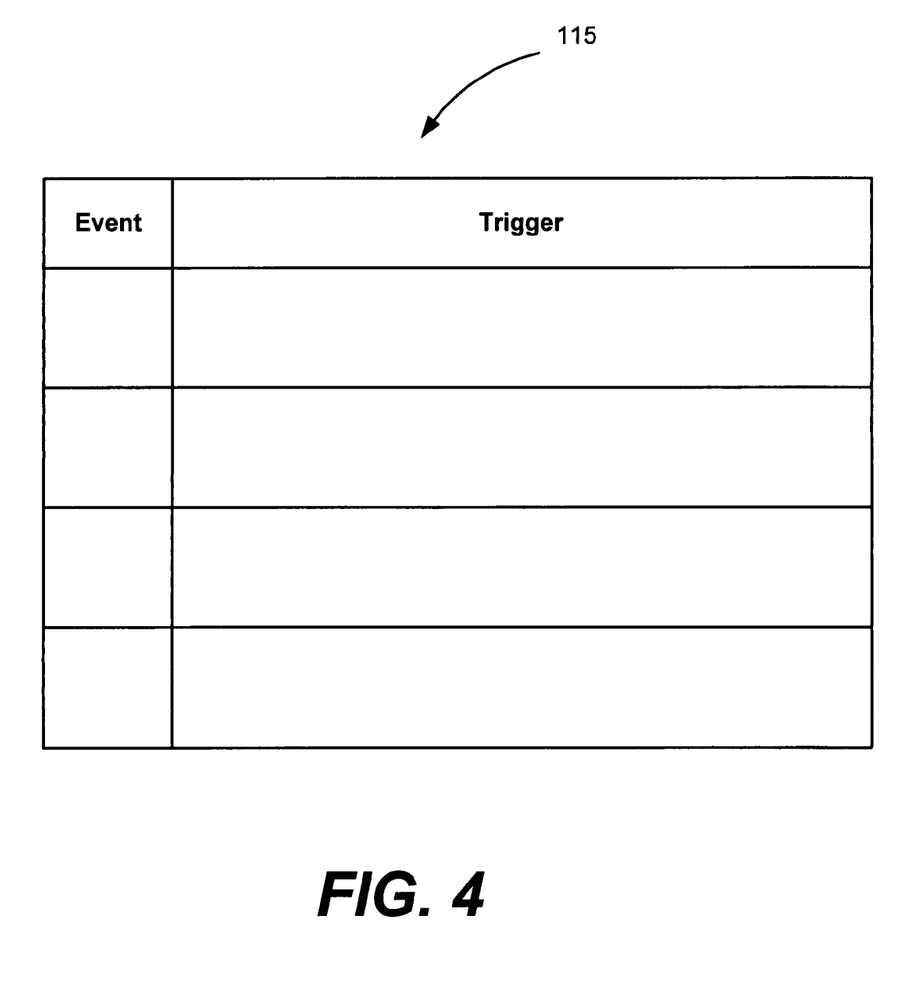
FIG. 4 is a representation of an example of a database triggers table.

The database triggers table 115, shown in more detail in FIG. 4, defines the database triggers associated with each event. In the example shown in FIG. 4, the database triggers table 115 includes two columns (event and trigger) and a row for each event. The event column identifies an event. The event column corresponds to the event column in the state transition table 110. The trigger column defines the database trigger that will correspond to the event in that row. The database triggers in the trigger column are disabled except when the business rule is invoked.

Figure 5:
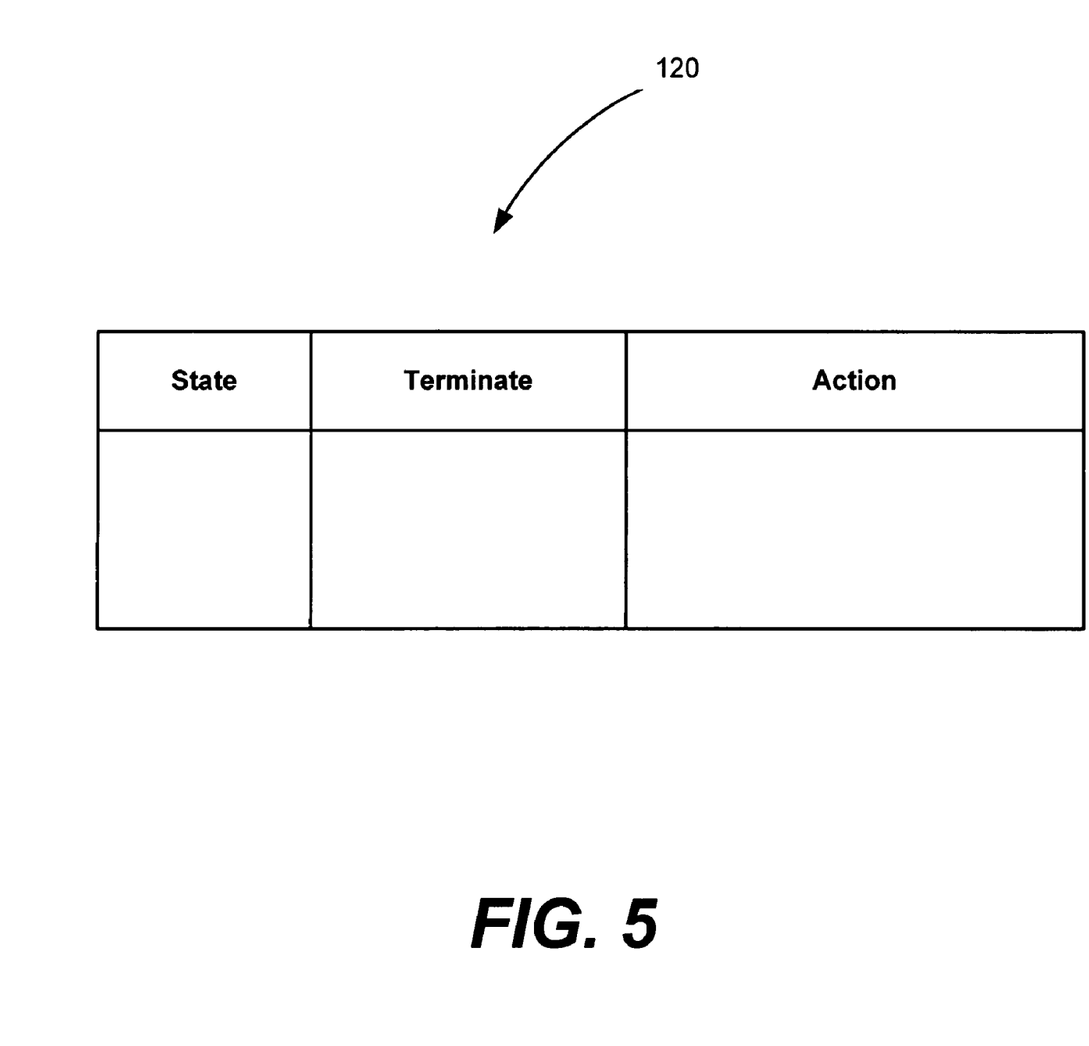
FIG. 5 is a representation of an example of an action table.

The action table 120, shown in more detail in FIG. 5, defines the actions to be taken upon entering a particular state. In the example shown in FIG. 5, the action table 120 includes three columns (state, terminate, and action) and a row for each state. The state column includes a number or some other indicator for a state. The terminate column specifies whether the business rule is to terminate upon entering the state identified on that row. The action column defines an action to be taken upon entering the state associated with that row.

Figure 6:
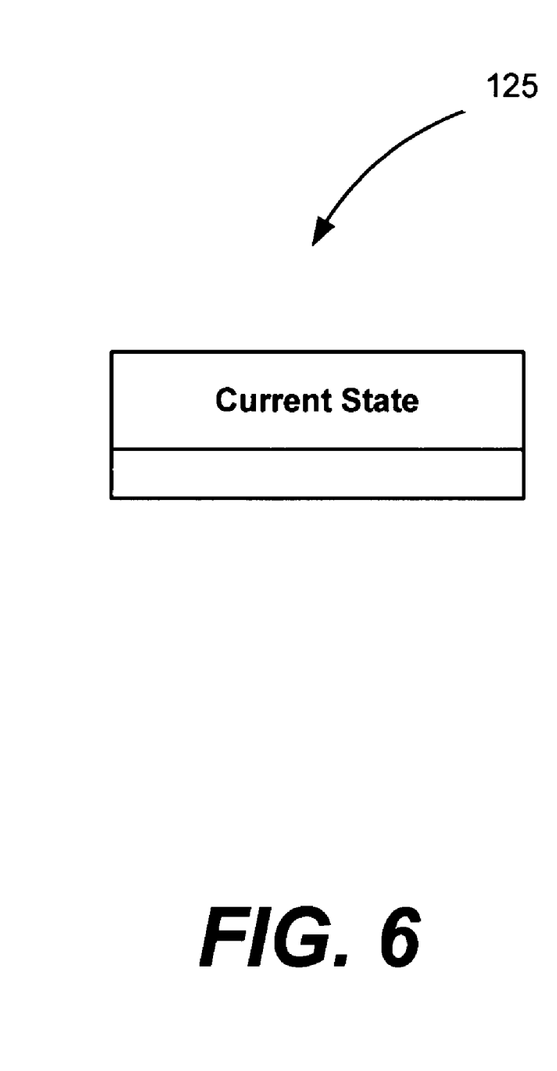
FIGS. 6-8 are representations of a current state table.

The current state table 125, shown in more detail in FIG. 6, identifies the current state of the state machine. In the example shown in FIG. 6, the current state table 125 includes one column, current state, which includes a number or some other indicator for the current state of the state machine, and one row.

Figure 7:
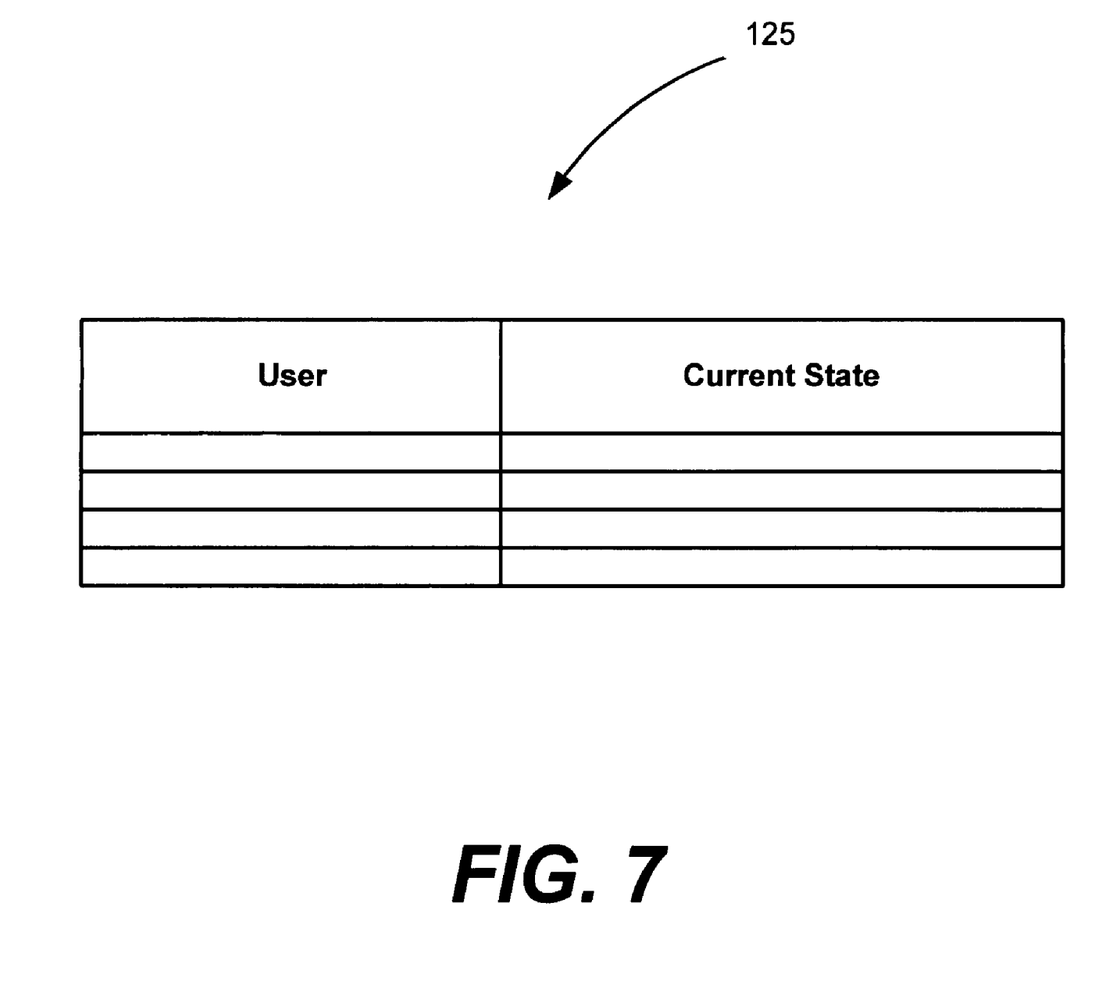

In another example, shown in FIG. 7, the current state table allows the state machine to have different current states for different users. In this example, the current state table has two columns (user and current state) and a row for each user. The user column identifies a particular user. The current state column identifies the current state of the state machine for that user.

Figure 8:
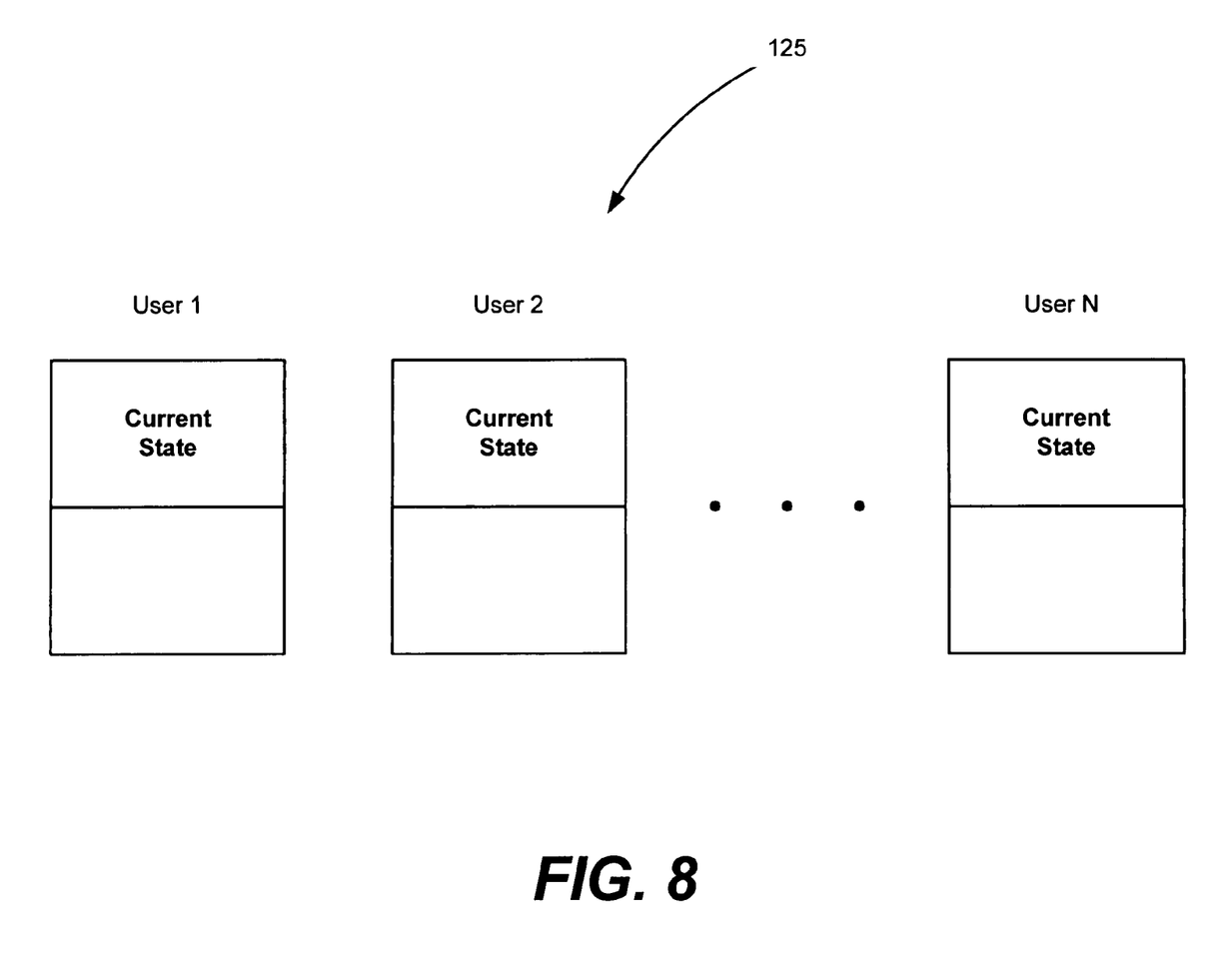

FIG. 8 illustrates another approach to the current state table. In this example, each user has a separate current state table. Each current state table includes a single column and a single row, which contains the current state for the user associated with that table.

Many users may desire access to the same business rule automation system. To accommodate that access, a pseudo lock may be provided to serialize access to the current state table.

It will be understood that the tables described above can take on any number of alternative configurations without departing from the spirit of the invention. It will also be understood that the description above is most relevant to a RDBMS. This same approach could be applied in other types of database systems without departing from the spirit of the invention.

An example business rule automation system will now be described with respect to a particular business rule, shown in FIG. 9. The business rule being implemented is:

Buy Stock A when its price falls below $20, but only if Stock B is above $50.

A state machine 905 is designed to implement the business rule. The state machine includes four states (state 1, state 2, state 3, and state 4) shown on FIG. 9 as ovals. The transitions between the states are represented by arrows, with the triggers causing the transitions shown by the text within the arrows.

The state machine is in State 1 when StockA>$20 and StockB<$50. The state machine transitions out of State 1 if either condition changes. The state machine transitions into State 2 if StockA<$20, as indicated in the text within the arrow from State 1 to State 2, and into State 3 if StockB>$50, as indicated in the text within the arrow from State 1 to State 3.

The state machine is in State 2 when Stock A<$20 and StockB<$50. The state machine transitions out of State 2 if either condition changes. The state machine transitions into State 1 if StockA>$20, as indicated in the text within the arrow from State 2 to State 1, and into State 4 if StockB>$50, as indicated in the text within the arrow from State 2 to State 4.

The state machine is in State 3 when Stock A>$20 and StockB>$50. The state machine transitions out of State 3 if either condition changes. The state machine transitions into State 1 if StockB<$50, as indicated in the text within the arrow from State 3 to State 1, and into State 4 if StockA<$20, as indicated in the text within the arrow from State 3 to State 4.

The state machine transitions to State 4 when StockA<$20 and StockB>$50. Upon entering State 4, the state machine causes an action to be taken, as shown in FIG. 9, the action being "place sell order for Stock B and buy order for Stock A." The state machine terminates after executing the action.

Figure 9:
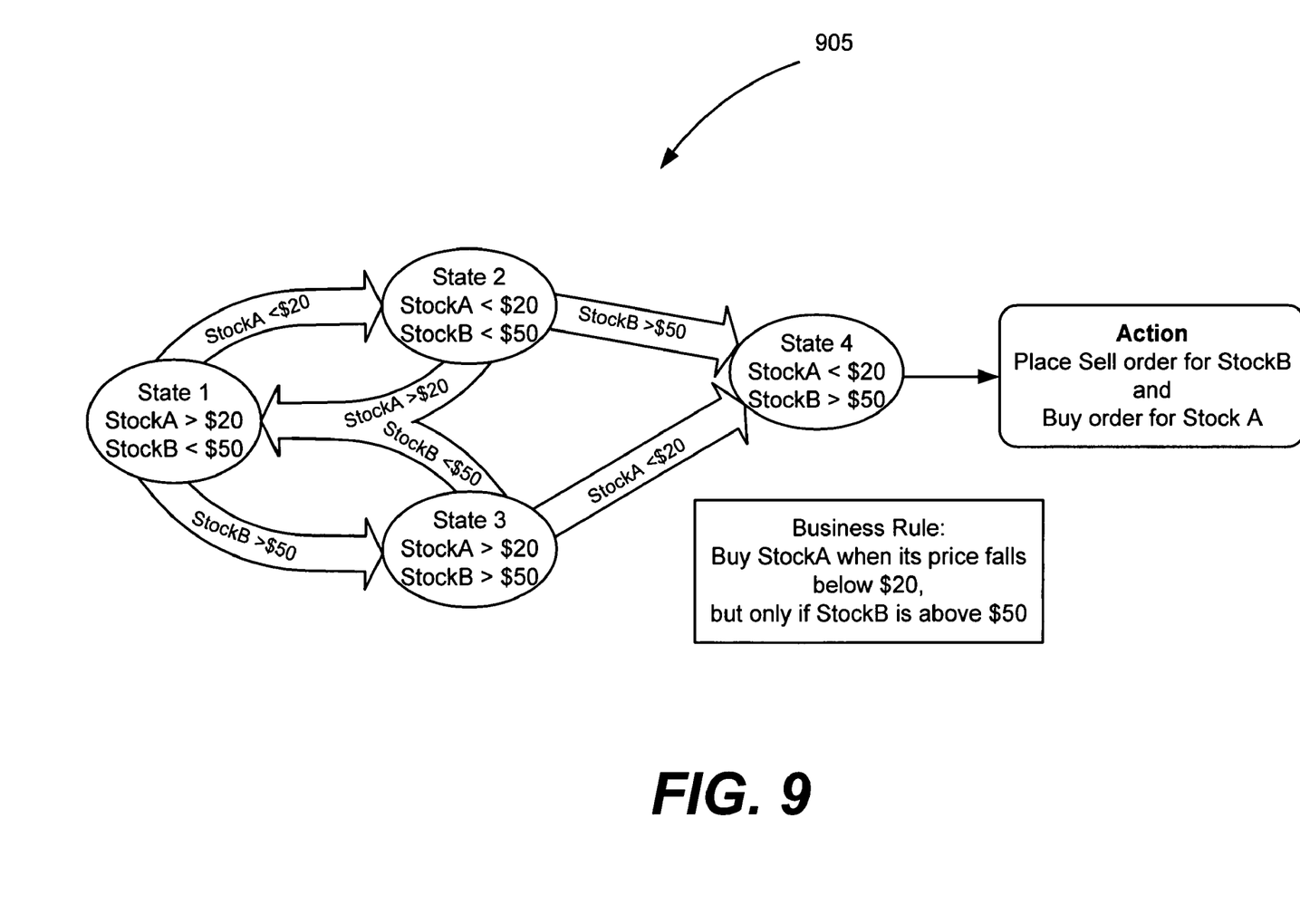
FIGS. 9-14 are representations of an example state machine.
Figure 10:
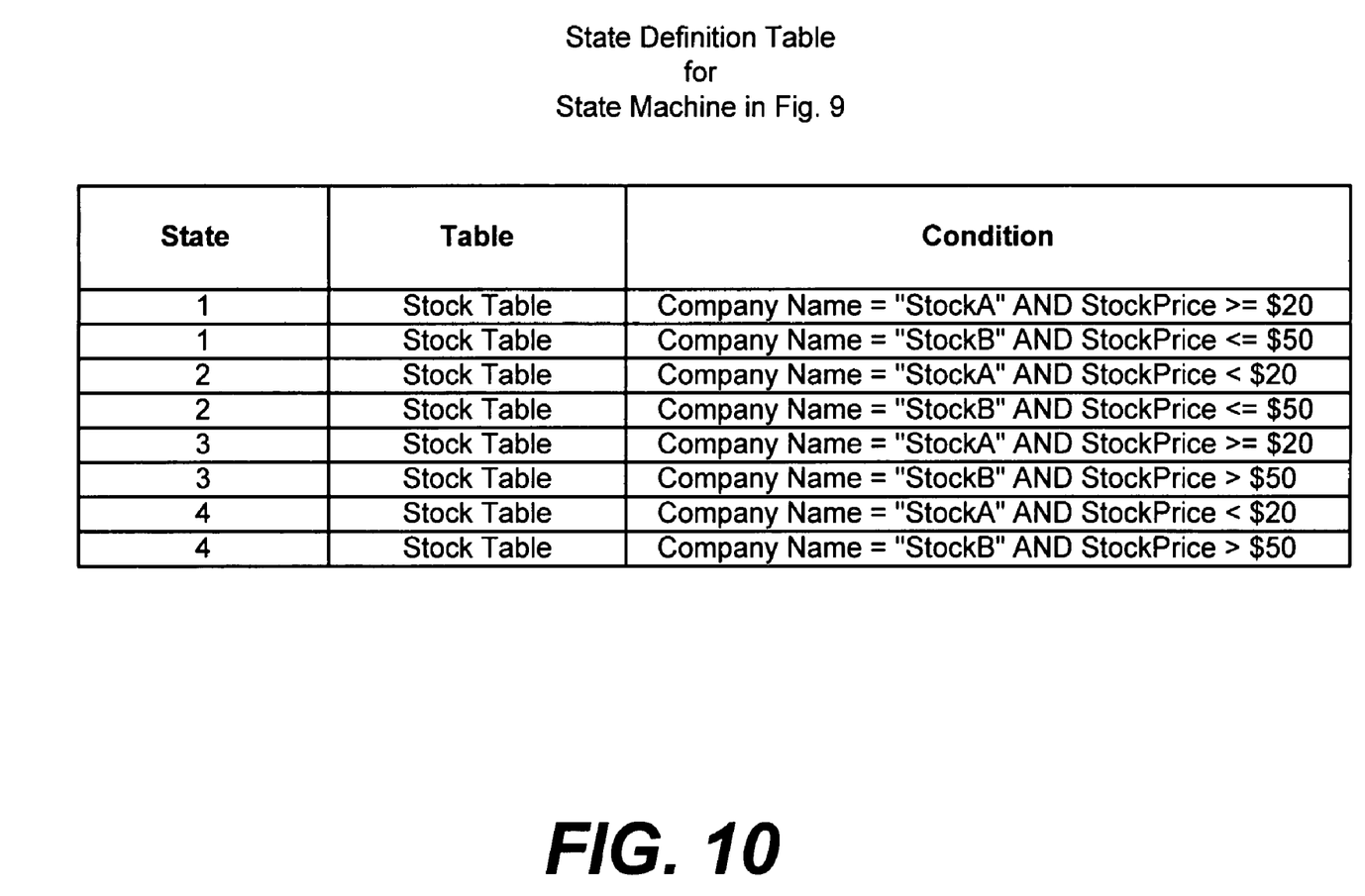

A state definition table to implement the state machine illustrated in FIG. 9, shown in FIG. 10, includes a row for each condition that must be satisfied in order for the state machine to be in that state. For example, State 1 has two conditions:

Company Name="StockA" AND StockPrice>=$20

Company Name="StockB" AND StockPrice<=$50

The table ("Stock Table") that contains the Company Name and StockPrice data is identified in the Table column. More than one table can be identified if the data is stored in more than one table.

Figure 11:
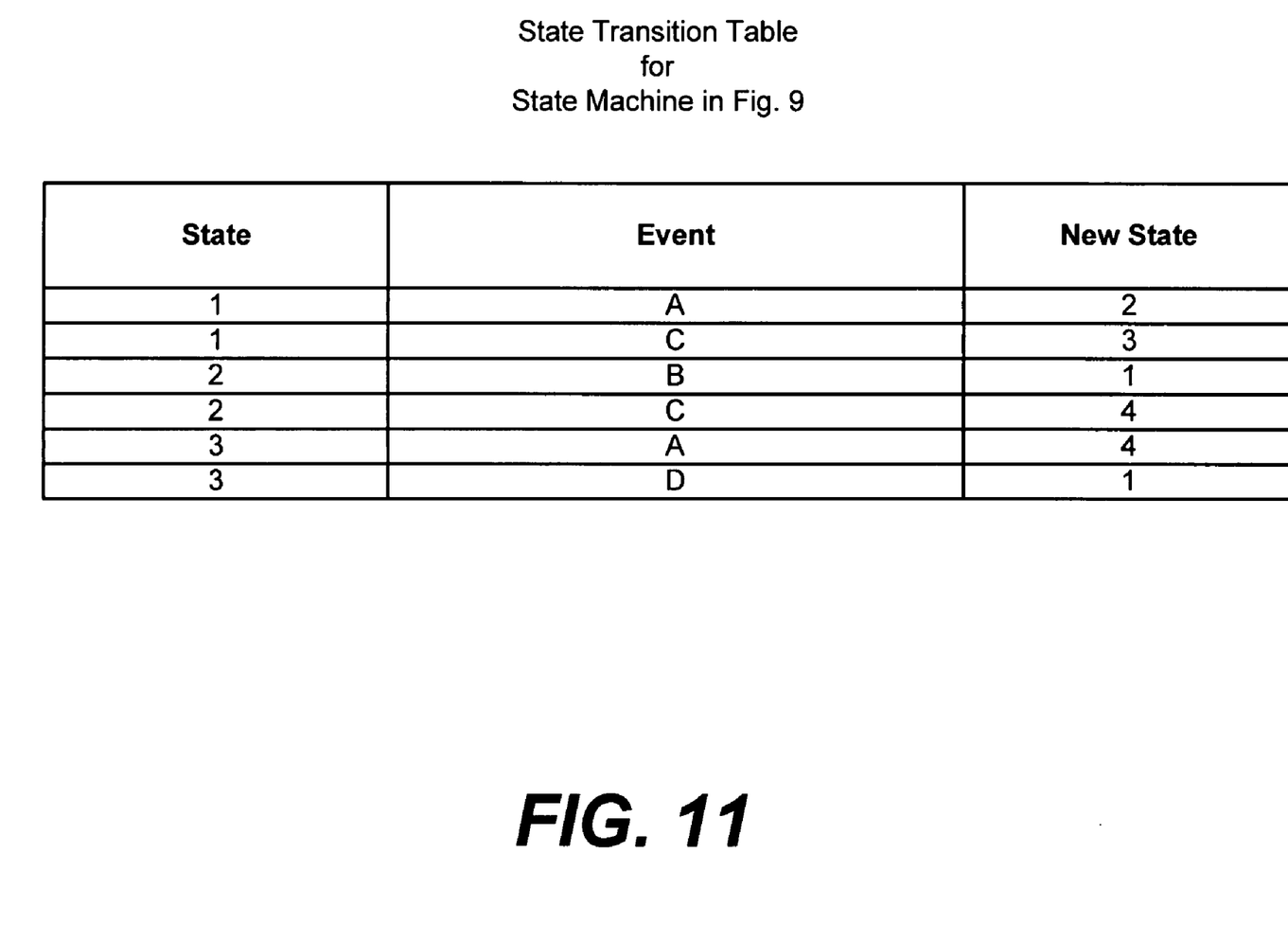

A state transition table to implement the state machine illustrated in FIG. 9, shown in FIG. 11, includes rows for each transition. For example, the state machine will transition: (a) from state 1 to state 2 upon the occurrence of event A, (b) from state 1 to state 3 upon the occurrence of event C, (c) from state 2 to state 1 upon the occurrence of event B, etc.

Figure 12:
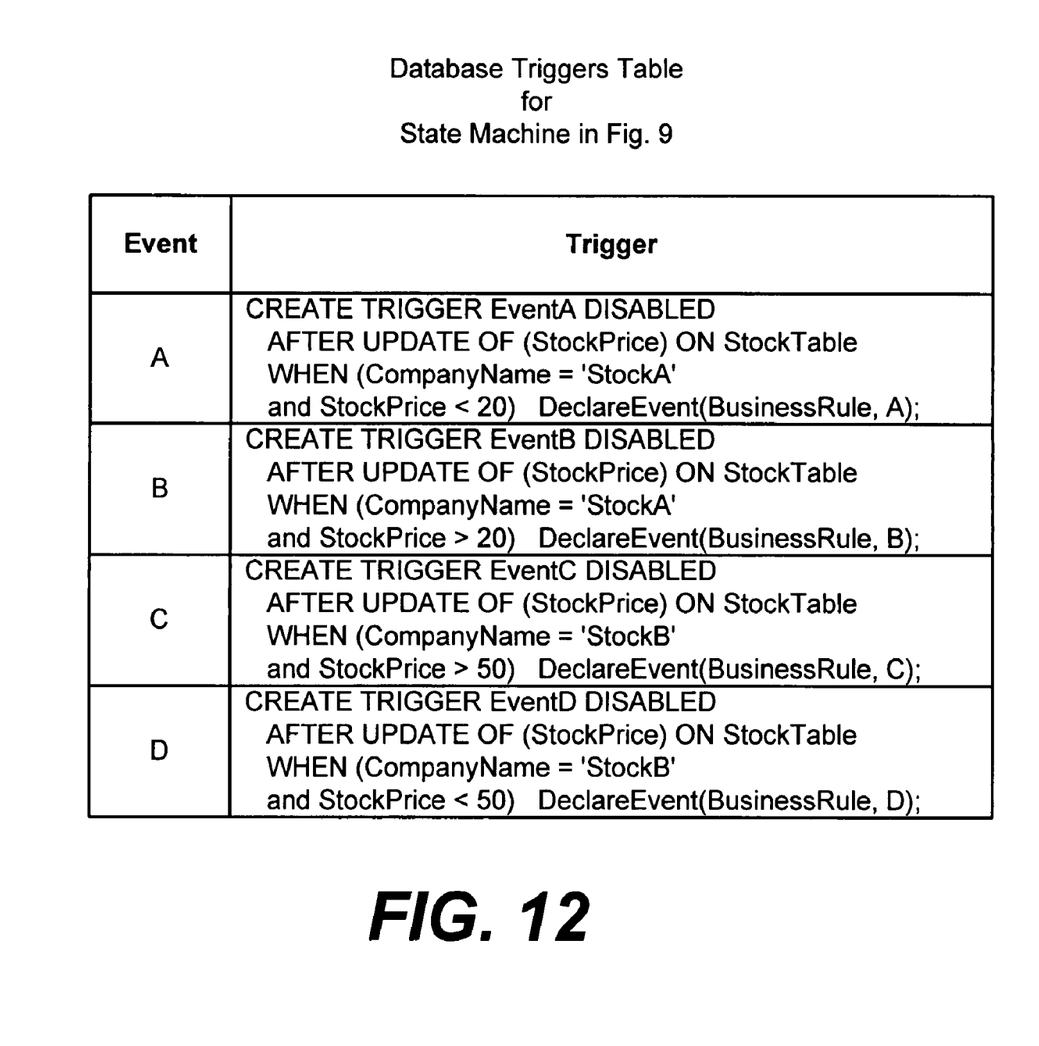

A database triggers table to implement the state machine illustrated in FIG. 9, shown in FIG. 12, includes two columns (event and trigger) and a row for each event. The event column includes an identifier for an event and the trigger column includes the trigger that will initiate that event. For example, event A has the following trigger:

CREATE TRIGGER Event A DISABLED

AFTER UPDATE OF (StockPrice) ON StockTable

WHEN (CompanyName='StockA"

and StockPrice<20) DeclareEvent(BusinessRule, A);

Event A occurs when StockPrice is updated in the StockTable, CompanyName is StockA, and StockPrice is less than 20. If those conditions are satisfied, Event A associated with the BusinessRule is declared. Note that, initially, the trigger associated with Event A is disabled.

Figure 13:
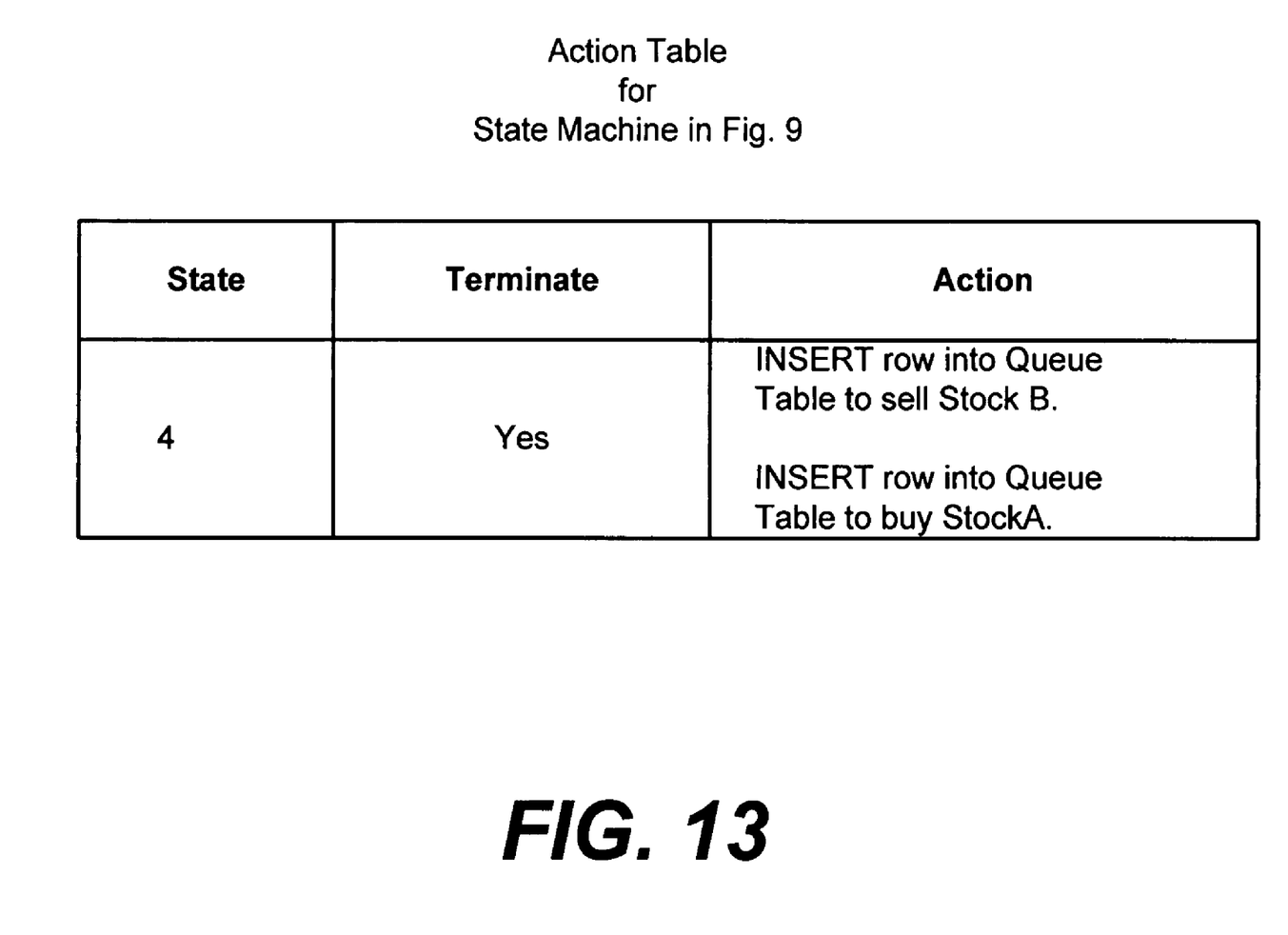

An action table to implement the state machine illustrated in FIG. 9, shown in FIG. 13, includes a row for each state that has an associated action. In the example shown, the action that occurs upon entering state 4, is:

INSERT row into Queue Table to sell Stock B,
INSERT row into Queue Table to buy Stock A.

Thus, upon entering state 4, the state machine will take the action shown in the action column of the action table. Then, because the terminate flag is set for State 4, the state machine will terminate by disabling all of the triggers in the database triggers table (FIG. 12).

Figure 14:
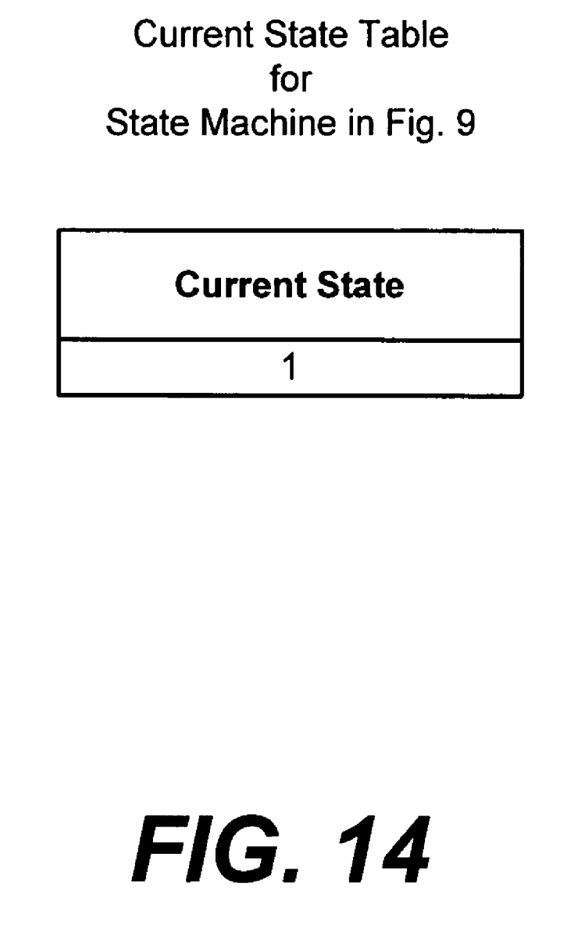

A current state table for the state machine in FIG. 9, shown in FIG. 14, includes a single entry for the current state of the state machine. In the example shown, the state machine is in state 1, in which StockA<$20 and StockB<$50.

When the current state table has entries for multiple users, such as is shown in FIG. 7, or when the current state table includes multiple tables, as shown in FIG. 8, it may be necessary to have multiple state definition tables and multiple database triggers tables. Using the example shown in FIG. 9, different users may have different thresholds at which they would like the state machine to transition from one state to another. For example, one user or class of users may desire to use $25 as the transition point for StockA and $45 for the transition point for StockB. In that case, an additional state definition table and an additional database triggers table would be provided with those transition points instead of the $20 and $50 transition points shown in FIGS. 10 and 12. It would not be necessary to replicate the state transition table and the action table because they would be the same for both sets of transition points.

To illustrate a few transitions using the state machine shown in FIG. 9, assume that the state machine is initialized by enabling all of the triggers in FIG. 12 and is placed in state 1 by inserting a "1" into the current state table, which means that the StockA is worth more than $20 and that StockB is worth less than $50. Assume that, at some point in time, the value of stock A drops below $20. That would trigger event A (see FIG. 12), which would cause a transition from state 1 to state 2 (see FIG. 11). Assume that subsequently Stock B rises above $50. That would trigger event C, which would cause a transition from state 2 to state 4. Entering state 4 causes the actions shown in FIG. 13 to be performed. The state machine would then be terminated (see FIG. 13).

The text above described one or more specific embodiments of a broader invention. The invention also is carried out in a variety of alternative embodiments and thus is not limited to those described here. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A database system for automating a business rule, including:

a state definition table defining one or more states for a business rule state machine;

a state transition table defining (a) one or more beginning states, (b) for each beginning state a corresponding ending state, each of the beginning states and the ending states corresponding to a state in the state definition table, and (c) for each beginning state an event that causes a transition from the beginning state to the corresponding ending state;

a database triggers table defining the one or more database triggers, each event identified in the state transition table being associated in the database triggers table with one or more of the database triggers, the database triggers in the database triggers table being disabled except when the business rule is activated;

an action table defining one or more actions to be performed on entering one or more of the states identified in the state definition table;

a current state table for each user of the business rule state machine, each current state table defining the current state of the business rule state machine for the user associated with that current state table, the current state table for each user being initialized with the states in the state definition table that correspond to current conditions for the user associated with that current state table when the business rule is activated; and storing the state definition table, the state transition table, the database triggers table, the action table, and the current state tables on a computer.

2. The database system of claim 1 further including:
a pseudo lock to serialize access to the current state table.

3. The database system of claim 1 further including:
a database triggers table for each user of the business rules state machine.

4. The database system of claim 1 wherein:
two or more of the state definition table, the state transition table, the database triggers table, the action table, and the current state table are included in the same database table.

5. The database system of claim 1 wherein:
the action table includes a "terminate" flag associated with one or more states, such that upon completion of the action associated with that state, the business rule will be deactivated by disabling the database triggers.

6. A method for automating a business rule in a database, including:

creating a business rule state machine by:

creating a state definition table defining one or more states, each of the states corresponding to one or more conditions of a system;

creating a state transition table defining (a) one or more beginning states, (b) for each beginning state a corresponding ending state, each of the beginning states and the ending states corresponding to a state in the state definition table, and (c) for each beginning state an event that causes a transition from the beginning state to the corresponding ending state;

creating a database triggers table defining the one or more database triggers, each event identified in the state transition table being associated in the database triggers table with one or more of the database triggers, the database triggers being disabled except when the business rule is activated;

creating an action table defining one or more actions to be performed on entering one or more of the states identified in the state definition table; and creating for each user of the business rule state machine a current state table defining the current state of the business rule state machine for the user associated with that current state table;

enabling one or more database triggers associated with the business rule state machine; and initializing the business rule state machine by determining for each user of the business rule state machine which of the states in the state definition table corresponds to current conditions for that user and initializing the current state table for that user with the determined current state.

7. The method of claim 6, further including:
providing parallel access to the business rule state machine by creating a current state table for each user of the business rule state machine.

8. The method of claim 6 wherein creating the action table further includes:
.associating a "terminate" flag with one or more states, such that upon completion of an action associated with that state, the business rule will be deactivated by disabling the database triggers.

9. The method of claim 6, further including:
creating an action table for each user of the business rules state machine.

10. the method of claim 6, further including:
serializing access to the business rule machine.

11. A computer program, stored on a tangible storage medium, for use in automating a business rule in a database, the computer program including executable instructions that cause a computer to:
create a business rule state machine by:
creating a state definition table defining one or more states, each of the states corresponding to one or more conditions of a system;
creating a state transition table defining (a) one or more beginning states, (b) for each beginning state a corresponding ending state, each of the beginning states and the ending states corresponding to a state in the state definition table, and (c) for each beginning state an event that causes a transition from the beginning state to the corresponding ending state;
creating a database triggers table defining the one or more database triggers, each event identified in the state transition table being associated in the database triggers table with one or more of the database triggers, the database triggers being disabled except when the business rule is activated;
creating an action table defining one or more actions to be performed on entering one or more of the states identified in the state definition table; and
creating for each user of the business rule state machine a current state table defining the current state of the business rule state machine for the associated with that current state table;
enable one or more database triggers associated with the business rule state machine; and
initialize the business rule state machine by determining for each user of the business rule state machine which of the states in the state definition table corresponds to current conditions for that user and initializing the current state table for that user with the determined current state.

12. The computer program of claim 11 where, when initializing the business rule state machine, the computer:
determines a current state of the business rule state machine by determining which of the states in the state definition table corresponds to current conditions; and
initializes the current state table with the determined current state.

13. The computer program of claim 11, where the computer program further includes executable instructions that cause the computer to:
provide parallel access to the business rule state machine by creating a current state table for each user of the business rule state machine.

14. The computer program of claim 11 where, when creating the action table, the computer further:
associates a "terminate" flag with one or more states, such that upon completion of an action associated with that state, the business rule will be deactivated by disabling the database triggers.

15. The computer program of claim 11, where the computer program further includes executable instructions that cause the computer to:
create an action table for each user of the business rules state machine.

16. The computer program of claim 11, where the computer program further includes executable instructions that cause the computer to:
serialize access to the business rule machine.

* * * * *